Oct. 8, 1929.  V. GLISCE  1,730,932
NOODLE MACHINE
Filed Aug. 31, 1928  2 Sheets-Sheet 1

INVENTOR
Vito Glisce
BY H. G. Manning
ATTORNEY

Oct. 8, 1929.  V. GLISCE  1,730,932
NOODLE MACHINE
Filed Aug. 31, 1928   2 Sheets-Sheet 2

INVENTOR
*Vito Glisce*
BY
*H. G. Manning*
ATTORNEY

Patented Oct. 8, 1929

1,730,932

UNITED STATES PATENT OFFICE

VITO GLISCE, OF WATERBURY, CONNECTICUT

NOODLE MACHINE

Application filed August 31, 1928. Serial No. 303,297.

This invention relates to machines for making macaroni, noodles and the like, and more particularly to a machine adapted for household use in which dough is cut into small portions and rolled into spiral form. The invention also contemplates the provision of cheese-grating means operable by the same mechanism as the dough cutting and rolling machine.

One object of this invention is to provide novel means for feeding and cutting up the dough and means connected therewith for grating cheese.

A further object is to provide a device of this nature which will be simple in construction, inexpensive to manufacture, easy to install and manipulate, compact, ornamental in appearance, and very efficient and durable in use.

With these and other objects in view, there has been illustrated on the accompanying drawings, one form in which the invention may be conveniently embodied in practice.

Noodle making device

Figure 1:
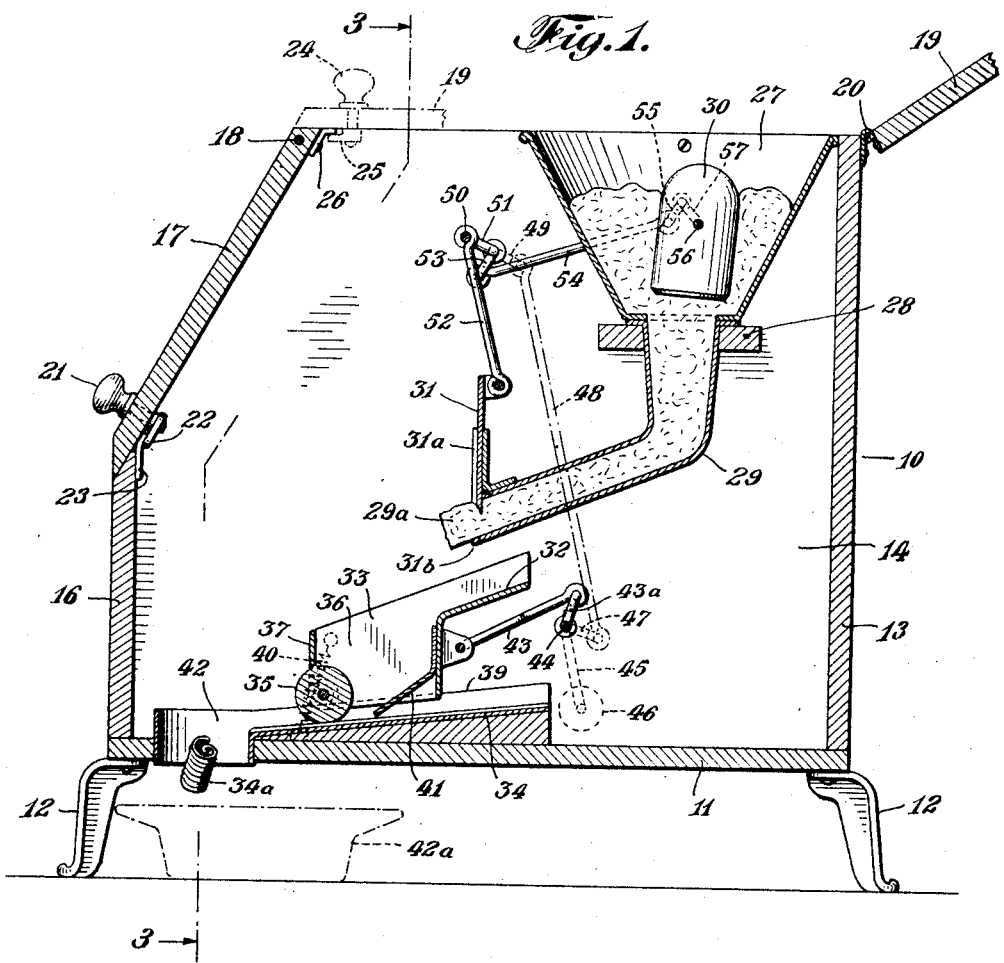
Fig. 1 is a sectional view illustrating the passage of the dough through the machine.
Figure 2:
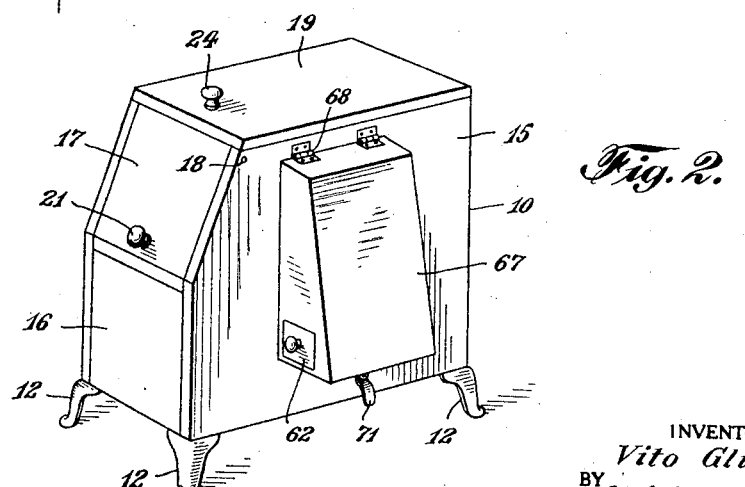
Fig. 2 is a perspective view on a smaller scale of the whole machine with the casing closed.
Figure 3:
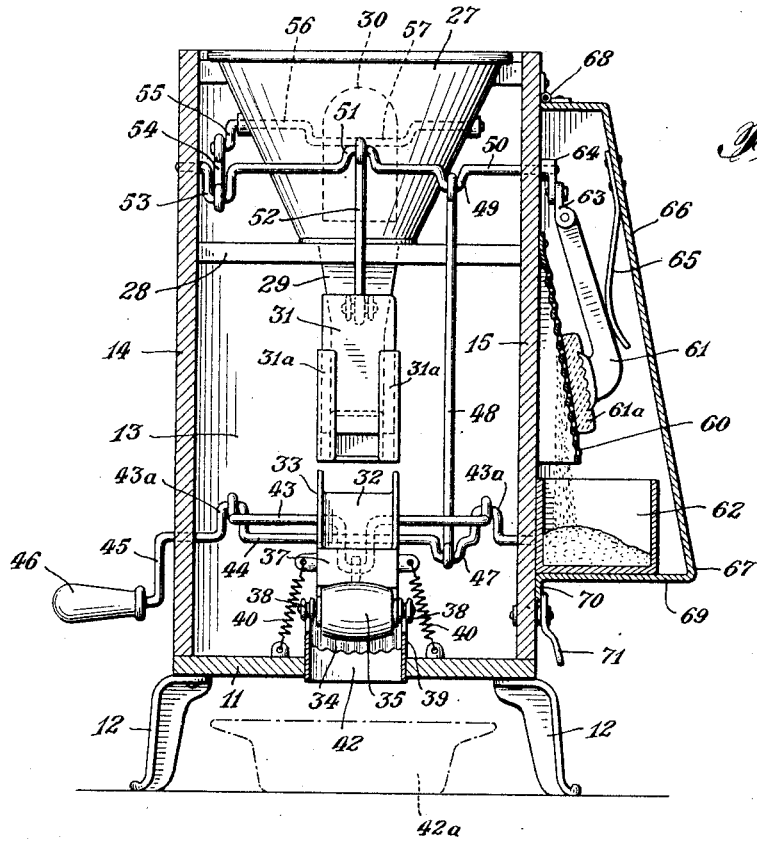
Fig. 3 is a sectional view taken along the line 3—3 of Fig. 1, looking in the direction of the arrows.

Referring now to the drawings, in which like reference numerals denote corresponding parts throughout the several views, the numeral 10 indicates a casing for housing the needle making mechanism. The casing 10 includes a base or floor 11 supported on legs 12, a rear wall 13, side walls 14 and 15, and a front wall 16. The front wall 16 has an inclined door 17 pivoted at its upper edge upon pins 18 located in the side walls 14 and 15, and the casing is covered by a movable top wall 19 secured at its rear edge to the rear wall 13 by hinges 20. The inclined front door 17 is provided with a handle knob 21 having a latch member 22 adapted to cooperate with a bracket or keeper 23 secured on the inner face of the front wall 16. In a similar manner, the top wall 19 is locked or released by operation of a handle 24 having a latch member 25 adapted to cooperate with a bracket or keeper 26 secured to the upper inner edge of the front door 17.

In order to hold a supply of plastic dough, provision is made of a hopper 27 preferably having its upper edge at substantially the level of the upper edges of the side walls of the casing, said hopper being supported at its bottom by a cross member or bridge 28. The hopper 27 is open at the bottom to permit the dough to be forced down into the upper end of an elbow-shaped tubular chute 29 by the reciprocating or forcing action of a plunger 30 actuated in a manner to be hereinafter described. The lower end of the chute 29 is inclined forwardly and downwardly and is preferably of square cross section so that the dough will be ejected therefrom in substantially cubical form, whereby cubical portions $29^a$ may be severed therefrom by successive strokes of a rectangular vertical knife 31 reciprocating in guides $31^a$. In order to support the dough against the action of the knife 31, the lower opposite side of the chute 29 may be extended as shown at $31^b$.

Figures 4, 5:
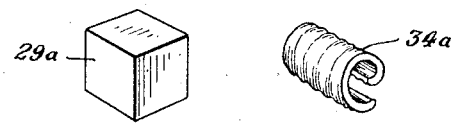
Fig. 4 is a perspective view of one of the cubical portions into which the dough is divided preparatory to rolling.
Fig. 5 is a perspective view illustrating the finished noodle as it is delivered from the machine.

From the end of the chute 29 the cut-off tubes $29^a$ of dough will drop by gravity upon an inclined guiding member 32 projecting rearwardly and upwardly from a reciprocating box 33 open at the top and bottom and slidable along a slightly inclined table or platen 34 upon which the cubes $29^a$ are adapted to be rolled into the desired spiral shape $34^a$ shown in Fig. 5 by means of a convex roller 35 rotatably mounted in the side walls 36 of the box 33, the front vertical wall 37 of said box being cut away at its bottom to make room for said roller 35. The box 33 may be guided and supported by means of a pair of flanged wheels 38 connected to the ends of said roller 35, said flanged wheels 38 being adapted to run on the upper edges of flanges or walls 39 formed on the inclined table 34, said flanges 39 also forming guides for the side walls for the chute 32. The box 33 and roller 35 may be held against lifting movement during the rolling of the dough cubes 29$^a$ by means of a pair of tension springs 40 connected at their upper ends to said box 33 and at their lower ends to the floor 11 of the casing 10. The reciprocating box 33 is also provided with an inclined deflector 41 extending downwardly from the back wall thereof to the platen 34 and serving to guide the cubes into position to be rolled. The platen 34 is preferably corrugated longitudinally and is also somewhat concave transversely so that it tends to guide the convex roller 35 in a straight line. The platen 34 is provided near its forward end with an outlet 42 through which the noodle rolls 34$^a$ are adapted to drop into a suitable receptacle 42$^a$ placed under the floor 11 of the casing 10.

Reciprocation of the box 33 and the roller 35 carried thereby may be effected by means of a U-shaped wire frame 43 pivoted at its ends in the box 33 and having two rearwardly extending arms pivoted to a pair of cranks 43$^a$ on a wire crank shaft 44 journalled in the side walls 14 and 15 of the casing 10. The crank shaft 44 extends through the wall 14 and has an exterior operating crank 45 and handle 46.

In order to vertically reciprocate the dough-pressing plunger 30 and cutter 31, the crank shaft 44 has an intermediate crank arm 47 located outside the box 33 and connected by an upwardly extending link 48 with a crank 49 formed on an upper crank shaft 50 journalled in the walls 14 and 15 in the upper part of the casing. The upper crank shaft 50 is provided at its center with a crank 51 connected by a depending link 52 with the knife 31, and at the end opposite from the crank 49 said upper crank shaft 50 has a crank 53 connected by an upwardly extending link 54 to a crank 55 on a plunger shaft 56 journalled at its ends in the sides of the hopper 28. The upper crank shaft 50 also has a central relatively long crank arm 57 journalled in the plunger 30.

Operation

In operation, when the parts are in the positions shown in Fig. 1, manual rotation of the crank shaft 44 in a "counter-clockwise" direction by means of the handle 46 will advance the reciprocating box 33 forwardly. At the same time the vertical knife 31 will be depressed to cut off a cube 29$^a$ of dough from the square dough chute 29, permitting said cube to slide down the guiding trough 32 into the box 33 beneath. During the advance of the box 33 and the downward movement of the knife 31, the linkage mechanism will cause the plunger 30 to be raised in the hopper 27. As the shaft 44 continues to rotate, the box 33 will be retracted rearwardly and the knife 31 will be raised. The plunger 30 will also be depressed for the purpose of forcing a new supply of dough from the chute 29 so that another cube 29$^a$ may be cut off by the knife 31 in its next downward movement. It will be evident that as the cube of dough falls into the box 33 it will be guided by the deflector 41 into a position on the platen 34 adjacent the roller 35. The rearward movement of the box 33 will therefore cause the roller 35 to shape the dough cube 29$^a$ into the desired spiral form 34$^a$, and said roller 35 will pass completely off the rear end of the rolled piece of dough 34$^a$ so that each time the roller moves forwardly, a completed noodle will be pushed ahead of it through said outlet 42 into the receptacle 42$^a$ beneath. The operations just described will be repeated as long as dough is supplied to the machine and the handle 46 is operated.

Cheese grating device

The present invention also includes the feature of grating cheese simultaneously with the operation of the main machine. To this end provision is made of an inclined fixed perforated grater member 60 preferably secured to the wall 15 of the casing 10 upon the outside thereof.

In order to move the cheese back and forth over the roughened surface of the grater member 60, provision is made of a cheese-gripping arm 61 having sharp projections at its lower end to engage the rind of a piece of cheese 61$^a$. The grated cheese passing through the grater 60 will drop through the open lower end thereof and be collected in a suitable receptacle 62.

The cheese-gripping arm 61 is connected at its upper end to a vertical link 63 pivoted upon a crank 64 mounted on the projecting end of the shaft 50. The gripping arm 61 is yieldingly urged toward the fixed grater member 60 by means of a leaf spring 65 fixed at its upper end to an inclined wall 66 of a cheese casing 67, said casing being hinged at its upper end at 68 to the wall 15 of the main casing 10. The casing 67 when in normal closed position completely encloses the cheese grating mechanism and is shaped at its bottom to provide a floor 69 to support the grated cheese receptacle 62.

In order to detachably lock the cheese casing 67 in closed position, the floor of said casing 67 has a depending lug 70 adapted to be engaged by a pivoted latch member 71 mounted on the side wall 15 of the main casing 10.

By means of this construction, it will be evident that during the operation of the noodle machine, previously described, the cheese gripping arm 61 will be moved up and down and will cause the cheese 61$^a$ to be grated.

In order to remove the grated cheese, it will only be necessary to unlock the cheese casing 67 by rotating the latch member 71, whereupon said casing may be swung out and the receptacle 62 removed, emptied, and replaced.

While there has been disclosed in this specification one form in which the invention may be embodied, it is to be understood that this form is shown for the purpose of illustration only, and that the invention is not to be limited to the specific disclosure, but may be modified and embodied in various other forms without departing from the spirit thereof. In short, the invention includes all the modifications and embodiments coming within the scope of the following claims.

Having thus fully described my invention, what is claimed as new and for which it is desired to secure Letters Patent of the United States, is:

1. In a dough-rolling machine of the character described, a platen on which dough is to be rolled, and means cooperating with said platen to roll the dough and deliver it in desired form, including a dough-receiving box reciprocable along said platen and a single roller rotatably mounted in said box to cooperate with said platen, said box having a wide opening adjacent said roller through which the dough is adapted to pass onto said platen.

2. In a dough rolling machine, a platen on which dough is to be rolled, and means cooperating with said platen to roll the dough and deliver it in desired form, including a dough-receiving box reciprocable along the platen, a roller rotatably mounted in said box to cooperate with said platen, and a deflector in said box to direct portions of dough to a position adjacent to said roller, said box having a wide opening between said roller and said deflector through which the dough is adapted to pass onto said platen.

3. In a noodle-rolling machine, a platen for receiving measured portions of dough, a dough-receiving box reciprocable along said platen, a roller movable with said box along said platen to cooperate therewith in rolling portions of said dough into noodle shape, a tubular member through which dough is supplied to a position above said box, and means to cut off suitable lengths of said dough from said tubular member to deliver them to said box.

4. In a dough-rolling machine, a platen arranged to enable portions of dough to be shaped thereon and to be discharged therefrom at a predetermined point therealong, a roller to cooperate with said platen, a reciprocating dough-receiving box movable along said platen and having a roller journaled therein, said box being open at the bottom and having an upwardly and rearwardly inclined guiding member for receiving dough from above, and an inclined deflector member to direct said dough toward the roller, and means to supply a portion of dough to the guiding member while the box is in the rearward part of its path in each reciprocation.

5. In a dough-rolling machine, means for forming measured portions of dough into desired shapes including a platen or table, a reciprocating box movable along said table, a roller journaled in said box and adapted to cooperate with said table during the reciprocation of said box, a hopper to receive a supply of dough, a tubular chute leading from said hopper to deliver dough to said box, a device in said hopper to force the dough into said chute, a knife movable transversely of said chute to cut off suitable lengths of the dough forced through said chute, a handle, and means operable by said handle to reciprocate said box, to operate said knife and to operate said forcing device.

6. In a dough-rolling machine, a platen to receive portions of dough to be rolled, said platen having an outlet for the portions of rolled dough positioned at one end thereof, a dough receiving box reciprocable along said platen, a roller journalled in said box at its forward end for cooperation with said platen, means for delivering measured portions of dough to said box, and common operating means for said box, the means for delivering measured portions of dough being adapted to cause delivery of a portion of dough each time the box is in the part of its path distant from said outlet.

In testimony whereof, I have affixed my signature to this specification.

VITO GLISCE.